No. 761,359. Patented May 31, 1904.

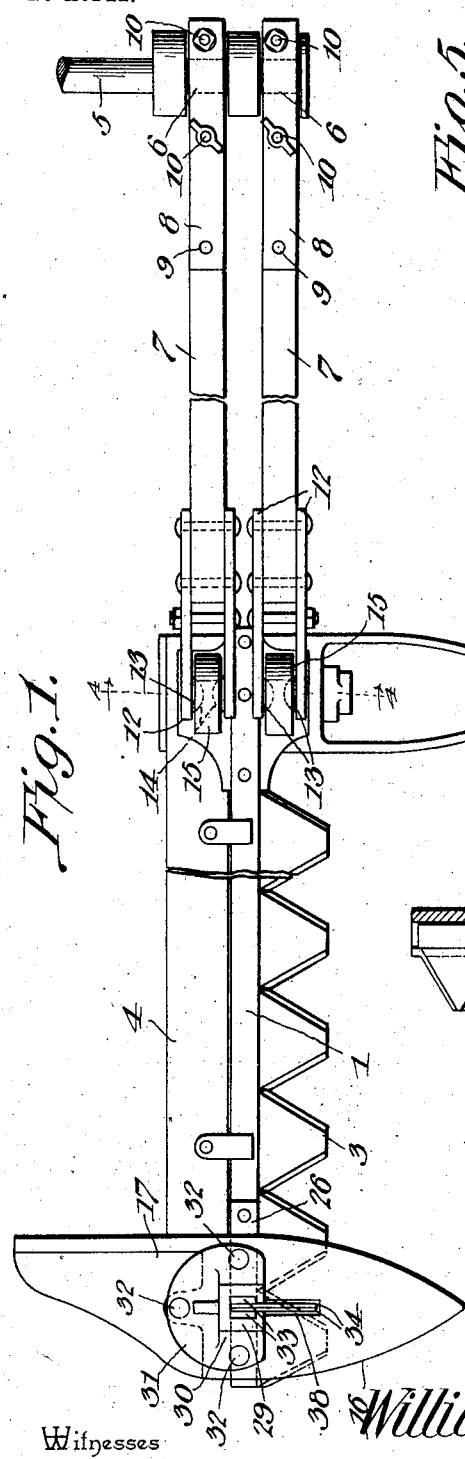

UNITED STATES PATENT OFFICE.

WILLIAM R. CLARKSON, OF NORTH YAKIMA, WASHINGTON, ASSIGNOR OF ONE-FOURTH TO JAMES L. COURTRIGHT AND JAMES F. COURTRIGHT, OF NORTH YAKIMA, WASHINGTON.

CUTTING APPARATUS FOR HARVESTERS.

SPECIFICATION forming part of Letters Patent No. 761,359, dated May 31, 1904.

Application filed January 27, 1904. Serial No. 190,856. (No model.)

*To all whom it may concern:*

Be it known that I, WILLIAM R. CLARKSON, a citizen of the United States, residing at North Yakima, in the county of Yakima and State of Washington, have invented a new and useful Cutting Apparatus for Harvesters, of which the following is a specification.

This invention relates to cutting apparatus for reapers, mowers, lawn-mowers, and other machines for cutting grain, grass, and other crops; and it has for its object to provide a cutting apparatus which shall be simple in construction and easily and effectively operated with light expenditure of power.

With these and other ends in view, which will appear as the nature of the invention is better understood, the same consists in the improved construction, arrangement, and combination of parts, which will be hereinafter described, and particularly pointed out in the claims.

In the accompanying drawings has been shown a simple and preferred form of embodiment of my invention, it being understood that I do not necessarily limit myself to the precise structural details therein exhibited, but reserve the right to any changes and modifications which lie within the scope of the invention and which may be resorted to without departing from the spirit or sacrificing the utility of the same.

In the drawings, Figure 1 is a top plan view of a device constructed in accordance with the principles of my invention. Fig. 2 is a front elevation, partly in section, of the same. Fig. 3 is a vertical sectional view taken through the vertical cutting apparatus. Fig. 4 is a sectional view taken on the line 4 4 in Fig. 1. Fig. 5 is a detail plan view of the double crank used in connection with my invention.

Corresponding parts in the several figures are indicated by similar numerals of reference.

In carrying out my invention I provide a pair of reversely and oppositely reciprocating sickle-bars, one of which (designated 1) is superposed upon the other (designated 2) and each of these carries blades or cutters 3 of ordinary construction, the cutting edges of which face and coöperate with each other. The sickle-bars 1 2 are shown as mounted upon a supporting-bar 4, which is provided with suitable guides for the sickle-bars. This supporting-bar is to be suitably connected with the frame of the machine to which my invention is applied in the manner of the ordinary finger-bar; but no connecting means have been shown, inasmuch as such means do not form a part of my invention. I would have it understood that guard-fingers may be used in connection with my invention; but I do not deem them necessary or essential, and they have not been shown in the drawings.

5 designates a suitably-supported driven shaft having a pair of oppositely-disposed cranks 6 6, which are connected by pitmen 7 7 with the sickle-heads of the respective sickle-bars. At their inner ends the pitmen 7 are provided with oppositely-disposed straps 8, secured thereto by means of rivets 9 and clamping-bolts 10, which latter serve to secure between the outer ends of the straps 8 the boxes 11, which engage the cranks 6. The outer end of each of the pitmen 7 is provided with a pair of oppositely-disposed straps 12, suitably secured thereto and provided upon their inner ends with approximately semispherical bulbs 13, engaging correspondingly-shaped recesses 14 in opposite sides of lugs 15, mounted upon the respective sickle-heads. It will be observed that by this construction a ball-and-socket connection is established between the pitmen and sickle-bars, which latter will thus be reversely reciprocated by the pitmen without danger of binding and with a light degree of friction.

The outer end of the supporting-bar 4 carries a shoe 16, with which it may be suitably connected by means of bolts or fastening devices extending through a heel-plate 17, extending rearwardly from said shoe, which latter serves in the usual manner to divide the grain that is to be left standing from that included in the swath cut by the machine. This shoe is constructed with a back wall 18, with which at $18^a$ is pivotally connected a rocking lever 19, provided at its upper end with laterally-extending arms 20, having forwardly-extending pins 36, carrying antifriction-rollers 37. The lower arm or member 22 of the rocking lever has a pin 23, carrying an antifriction-roller 24, engaging a notch or recess 25 in a block or boxing 26, mounted upon the sickle-bar 1 at the outer end of the latter. It is obvious that the shoe 16 constitutes a casing for the rocking member 19 and which is provided in the side thereof with a slot or opening 27, into which the outer ends of the sickle-bars are extended.

The upper side of the casing formed by the shoe has an opening 28, above which is disposed a sheath 29, tapering at its lower end, as shown at 30, and provided with a laterally-extending flange 31 for the passage of bolts 32, by means of which the said sheath is firmly secured upon the upper side of the shoe. The sheath 29 contains a pair of vertically-reciprocating sickle-bars 33, having blades or cutters 34 extending through a slot or opening in the front side of said sheath and disposed in contact with each other, like the blades of the sickle-bars 1 and 2. Each of the sickle-bars 33 is provided at its lower end with a lug 35, accommodated in the lower tapering or expanded portion of the sheath and each provided with a notch or recess 21, engaging the antifriction-roller 36 upon one of the laterally-extending arms 20 of the rocking member 19.

It will be seen from the foregoing description and by reference to the drawings that when the device is in operation the sickle-bar 1 2 will receive through the medium of the pitmen 7 an oppositely-reciprocatory movement from the cranks 6 upon the driven shaft 5, the said sickle-bars being thus operated to cut the swath. At the same time the upper sickle-bar by means of the block 26 at its outer end and the notch or recess engaging the antifriction-roller upon the lower end of the rocking member 19 will impart to the latter an oscillatory movement, whereby the vertically-disposed sickle-bars will be reversely reciprocated, thus serving to cut through matted and tangled grain, which is guided to the vertically-disposed cutting apparatus by means of the shoe 16. The latter is provided with a suitably-disposed slot 38 for the passage of the blades of the vertically-reciprocating sickle-bars, so that the tangled or matted grain will be operated upon as soon as it is lifted by the action of the shoe into engagement with the lower portion of the vertical cutting apparatus and that any entanglement which might operate to retard the progress of the machine is thus avoided.

I desire it to be especially noted that in the construction of my improved cutting apparatus I so proportion the parts that the throw or movement of the sickle-bars shall be as short as possible consistent with good results. In ordinary mowing-machines and harvesters the cranks operating the pitmen usually have a three-inch throw. In my improved machine I propose to use only a one-and-one-half-inch crank, this being found perfectly effective in view of the fact that the sickle-bars are reversely operated, as herein shown and described. The consequence is that my improved cutting apparatus, including the vertical cutting apparatus at the outer end of the horizontally-disposed cutting device, may be operated with a draft not exceeding and even less than that required to operate a cutting apparatus having only a single sickle-bar. This is obviously a feature of great importance and one the advantages of which will be greatly appreciated by those interested in this class of machinery. I desire it to be understood that I reserve the privilege of substituting for the use of cranks such obvious equivalents as eccentrics for the purpose of transmitting motion by means of pitmen to the reciprocatory sickle-bars without departing from my invention.

Having thus described my invention, I claim—

1. In a device of the class described, a supporting-bar, a pair of oppositely-reciprocatory sickle-bars mounted upon the latter, a shoe at the outer end of the supporting-bar, said shoe having a back wall, cutting apparatus including a pair of vertically-reciprocating bars supported by said shoe, a rocking lever pivotally supported upon the back wall of the shoe and having laterally-extending arms and a downwardly-extending member, antifriction-rollers upon said laterally-extending arms and downwardly-extending member, a block upon the outer end of the uppermost horizontal sickle-bar, having a notch engaging the roller upon the downwardly-extending member of the rocking lever, and blocks upon the lower ends of the vertically-reciprocating sickle-bars, having notches engaging the antifriction-rollers upon the laterally-extending arms of the rocking member.

2. In a device of the class described, a shoe having a back wall and provided with an opening in its upper side, a sheath mounted upon said shoe above the opening therein and having an expanded lower end and a slotted front side, vertical reciprocatory sickle-bars mounted in said sheath, provided at their lower ends with blocks accommodated in the expanded portion thereof and having notches formed therein, a rocking lever mounted pivotally upon the back wall of the shoe and having antifriction-rollers engaging said notched blocks, and means for imparting an oscillatory motion to said rocking lever.

3. In a device of the class described, the combination of a supporting-bar, a pair of oppositely-reciprocatory, sickle-bars upon the same, a shoe at the outer end of the supporting-bar, said shoe having a back wall and an opening in the upper side thereof, an upwardly-extending sheath mounted upon the shoe above said opening, a pair of vertically-reciprocatory cutter-bars disposed in said sheath, and means for transmitting motion in opposite directions from the upper sickle-bar upon the supporting-bar to the vertically-reciprocatory sickle-bars in the sheath.

In testimony that I claim the foregoing as my own I have hereto affixed my signature in the presence of two witnesses.

WILLIAM R. CLARKSON.

Witnesses:
MARTIN SCHICHTL,
FRED CHANDLER.